United States Patent
Collins et al.

(10) Patent No.: US 9,805,102 B1
(45) Date of Patent: *Oct. 31, 2017

(54) CONTENT ITEM SELECTION BASED ON PRESENTATION CONTEXT

(71) Applicant: Google Inc., Mountain View, CA (US)

(72) Inventors: Alexander Collins, San Francisco, CA (US); Gary Sivek, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 223 days.

This patent is subject to a terminal disclaimer.

(21) Appl. No.: 14/936,844

(22) Filed: Nov. 10, 2015

Related U.S. Application Data

(63) Continuation of application No. 13/840,995, filed on Mar. 15, 2013, now Pat. No. 9,213,749.

(51) Int. Cl.
 *G06F 17/30* (2006.01)

(52) U.S. Cl.
 CPC .. *G06F 17/30554* (2013.01); *G06F 17/30864* (2013.01)

(58) Field of Classification Search
 None
 See application file for complete search history.

(56) References Cited

U.S. PATENT DOCUMENTS

| | | | |
|---|---|---|---|
| 8,271,328 B1 | 9/2012 | Baltz et al. | |
| 8,335,718 B2 | 12/2012 | Feldman et al. | |
| 8,478,643 B1 | 7/2013 | Koningstein | |
| 2007/0038508 A1 | 2/2007 | Jain et al. | |
| 2008/0004962 A1 | 1/2008 | Muthukrishnan et al. | |
| 2008/0208841 A1 | 8/2008 | Zeng et al. | |
| 2011/0047026 A1* | 2/2011 | Biggs | G06Q 30/02 705/14.46 |
| 2013/0132391 A1 | 5/2013 | Priyadarshan et al. | |
| 2013/0246412 A1 | 9/2013 | Shokouhi et al. | |

OTHER PUBLICATIONS

Ponnuswami et al. ("On Composition of a Federated Web Search Result Page: Using Online Users to Provide Pairwise Preference for Heterogeneous Verticals"), WSDM'11, Feb. 9-12, 2011, pp. 715-724.*

\* cited by examiner

*Primary Examiner* — Alexander Khong
(74) *Attorney, Agent, or Firm* — Fish & Richardson P.C.

(57) ABSTRACT

Methods, systems, and apparatus for selecting content items based on presentation context are presented. In one aspect, a method includes for each of a plurality of content item slots of a resource: obtaining first performance data based on a performance of content items that were presented in a navigational context in the content item slot; obtaining second performance data based on a performance of content items that were presented in a non-navigational context in the content item slot; determining, from the first and second performance data, a navigational performance adjustment factor for the content item slot, the navigational performance adjustment factor indicating, for the content item slot, a performance of content items presented in the navigational context relative to a performance of content items presented in the non-navigational context.

18 Claims, 5 Drawing Sheets

CONTENT ITEM SELECTION BASED ON PRESENTATION CONTEXT

CROSS-REFERENCE TO RELATED APPLICATIONS

This application is a continuation application of, and claims priority to, U.S. patent application Ser. No. 13/840,995 entitled "CONTENT ITEM SELECTION BASED ON PRESENTATION CONTEXT," which was filed on Mar. 15, 2013, the disclosure of which is incorporated herein by reference in its entirety.

BACKGROUND

This specification relates to selecting content items based on presentation context.

The Internet has enabled access to a wide variety of resources, e.g., video and/or audio files, web pages for particular subjects, news articles, etc. Access to these resources has likewise enabled opportunities to provide additional content with the resources. For example, a user device may request a resource, such as a search results page from a search engine, by submitting a search query to a search engine. The search results page includes instructions that cause the user device to request content items for presentation with the search results page. Content items of particular interest to a user can be identified by a content management system in response to the user request. The request can include information the content management system can use to identify and, optionally, rank the content items so that the content items are presented to the user according to the rank in content item slots on the search results page.

SUMMARY

This specification describes technologies relating to content item selection based on presentation context.

In general, one innovative aspect of the subject matter described in this specification can be embodied in methods that include the actions of: for each of a plurality of content item slots of a resource: obtaining first performance data based on a performance of content items that were presented in a navigational context in the content item slot; obtaining second performance data based on a performance of content items that were presented in a non-navigational context in the content item slot; and determining, from the first and second performance data, a navigational performance adjustment factor for the content item slot, the navigational performance adjustment factor indicating, for the content item slot, a performance of content items presented in the navigational context relative to a performance of content items presented in the non-navigational context. Other embodiments of this aspect include corresponding systems, apparatus, and computer programs, configured to perform the actions of the methods, encoded on computer storage devices.

These and other embodiments can each optionally include one or more of the following features. The method may further include receiving a request for a content item from a user device, the request specifying one of the plurality of content item slots of the resource; obtaining a plurality of eligible content items that are eligible to be provided in response to the request; obtaining a predicted performance measure for each of the eligible content items; determining that at least one of the eligible content items is to be presented in a navigational context; and adjusting the predicted performance measure of each eligible content item that is to be presented in the navigational context based on the navigational performance adjustment factor that corresponds to the content item slot specified by the request.

The method may also include identifying a query associated with the request; and the determination that at least one of the eligible content items is to be presented in a navigational context may be based on the query and the at least one eligible content item. In addition, the method may include obtaining a navigational score for a particular eligible content item of the eligible content items, the navigational score indicating a measure of likelihood that the particular eligible content item is navigational for the query associated with the request; and determining that at least one of the eligible content items is to be presented in the navigational context may comprise: determining that the navigational score for the particular eligible content item meets a navigational score threshold; and in response to determining that the navigational score for the particular eligible content item meets the navigational score threshold, determining that the particular eligible content item is to be presented in the navigational context.

The method may include selecting a content item from the plurality eligible content items based on the predicted performance measures that correspond to the eligible content items; and providing the user device with the selected content item in response to the request.

Adjusting the predicted performance measure of each eligible content item that is to be presented in the navigational context may include increasing, for each eligible content item that is to be presented in the navigational context, the predicted performance measure of the eligible content item by multiplying the predicted performance measure of the eligible content item by the navigational performance adjustment factor that corresponds to the content item slot specified by the request.

Adjusting the predicted performance measure of each eligible content item that is to be presented in the navigational context may include decreasing, for each eligible content item that is to be presented in the navigational context, the predicted performance measure of the eligible content item by multiplying the predicted performance measure of the eligible content item by the navigational performance adjustment factor that corresponds to the content item slot specified by the request.

The first and second performance data may each include data specifying one or more content item extensions that were presented with the content items, and the method may further include: for each of the content items that were presented in the navigational context: obtaining extension performance data for the content item based on the performance of the content item when presented in the navigational context with an extension; obtaining non-extension performance data for the content item based on the performance of the content item when presented in the navigational context without the extension; and determining, from the extension and non-extension performance data, an extension adjustment factor for the content item, the extension performance adjustment factor indicating, for the content item, a performance of the content item when presented with the extension relative to the performance of the content item when presented without the extension.

The first performance data may include a first click-through rate; the second performance data may include a second click-through rate; and the predicted performance measure may be a predicted click-through rate.

The navigational context of a given presentation of a content item may be based on the content item and a query.

In general, another aspect of the subject matter described in this specification can be embodied in methods that include the actions of: for each of a plurality of content item slots of a resource: obtaining a performance measure for each of a plurality of content items that were presented in the content item slot, the plurality of content items including at least one navigational content item and at least one non-navigational content item; comparing the performance measures of each of the navigational content items to the performance measures of each of the non-navigational content items; and generating, based on the comparison, a navigational performance adjustment factor for the content item slot, the navigational performance adjustment factor indicating, for the content item slot, a performance of navigational content items relative to non-navigational content items. Other embodiments of this aspect include corresponding systems, apparatus, and computer programs, configured to perform the actions of the methods, encoded on computer storage devices.

These and other embodiments can each optionally include one or more of the following features. The method may further include receiving a request for a content item from a user device, the request specifying one of the plurality of content item slots of the resource; obtaining a plurality of eligible content items that are eligible to be provided in response to the request; obtaining a predicted performance measure for each of the eligible content items; determining that at least one of the eligible content items is a navigational content item; and adjusting the predicted performance measure of each navigational content item based on the navigational performance adjustment factor that corresponds to the content item slot specified by the request.

The method may also include selecting a content item from the plurality eligible content items based on the predicted performance measures that correspond to the eligible content items; providing the user device with the selected content item in response to the request.

Particular embodiments of the subject matter described in this specification can be implemented so as to realize one or more of the following advantages. Using historical performance data and presentation data for content items, particular content item slots may be associated with information that indicates how the performance of content items presented in those slots varies depending on presentation context. Accordingly, improved predicted performance measures for particular content item slots may be used to facilitate delivery of content items that are likely to satisfy a user's informational need. Content item providers may also benefit by having their content items presented when the context indicates that their content items may be of interest to a user. In addition, the performance of content item extensions in various contexts can be used to select extensions in a manner that accounts for the presentation context and in a manner that is likely to satisfy a user's informational need.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

A content management system facilitates the provision of content items, such as advertisements, to user devices. For example, a user device may request advertisements from a content management system, and in response, the system selects relevant advertisements to provide to the user device. The systems and methods disclosed herein facilitate the selection of content items in a manner that accounts for the effects of presentation context on the performance of navigational content items.

For each content item slot of a resource, performance data is obtained for content items that were presented in the content item slot. For example, if a web page has two advertisement slots, click-through rates for each advertisement presented in the advertisement slots may be obtained from click logs. The performance data for each content item slot may be separated into two categories, e.g., one performance measure for content items that were presented in a navigational context, and another performance measure for content items that were presented in a non-navigational context. For example, one performance measure may specify, for an ad slot, the click-through rate of navigational advertisements while the other performance measure for the ad slot specifies the click-through rate of non-navigational advertisements. Whether a content item is navigational or not depends on the context in which the content item is presented, such as the content of the resource with which the content item is presented or similarities between a content item and a user query. Thus, a content item may be navigational when presented in one context, and non-navigational when presented in another.

From the first and second performance measures, the content management system determines a navigational performance adjustment factor. The navigational performance adjustment factor indicates, for a content item slot, the performance of navigational content items relative to non-navigational content items. For example, in a first ad slot, navigational ads may have twice the click-through rate as non-navigational ads, and an adjustment factor for the first ad slot may be 2. In a second ad slot, navigational ads may have half the click-through rate of non-navigational ads, and an adjustment factor for the second ad slot may be 0.5. The navigational performance adjustment factor may be used by the content management system to select content items that are to be presented in response to a request for content items.

Example Environment

Figure 1:
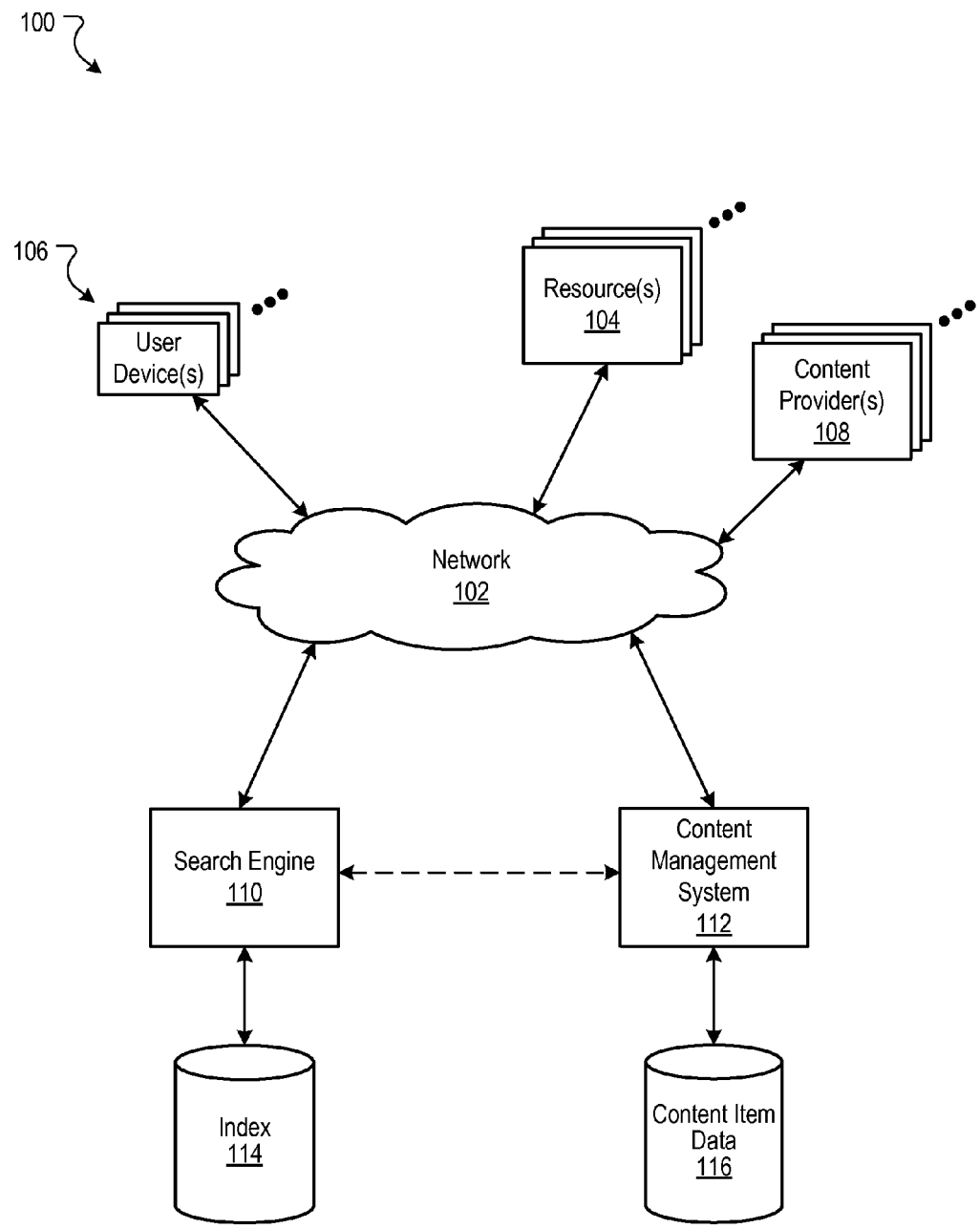
FIG. 1 is a block diagram of an example environment in which content items are selected based on presentation context.

FIG. 1 is a block diagram of an example environment 100 in which content items are selected based on presentation context. A computer network 102, such as a local area network (LAN), wide area network (WAN), the Internet, or a combination thereof, connects publisher resources 104, user devices 106, content providers 108, a search engine 110, and a content management system 112. The online environment 100 may include many thousands of publisher resources 104 and user devices 106.

A resource 104 is any data that can be provided by a publisher over the network 102 and that is associated with a resource address. Resources 104 include HTML pages, word processing documents, and portable document format (PDF) documents, images, video, and feed sources, to name just a few. The resources 104 can include content, such as words, phrases, pictures, and so on, and may include embedded information (such as meta information and hyperlinks) and/or embedded instructions (such as JavaScript scripts).

A user device 106 is an electronic device that is under the control of a user and is capable of requesting and receiving resources 104 over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the world wide web or a local area network.

To facilitate searching of these resources 104, the search engine 110 identifies the resources by crawling the publisher web sites that host the resources 104 and indexing the resources provided by the publisher web sites. The indexed and, optionally, cached copies of the resources, are stored in an index 114.

The user devices 106 submit search queries to the search engine 110. The search queries are submitted in the form of a search request that includes the search request and, optionally, a unique identifier that identifies the user device 106 that submits the request. The unique identifier can be data from a cookie stored at the user device, or a user account identifier if the user maintains an account with the search engine 110, or some other identifier that identifies the user device 106 or the user using the user device.

In response to the search request, the search engine 110 uses the index 114 to identify resources that are relevant to the queries. The search engine 110 identifies the resources in the form of search results and returns the search results to the user devices 106 in search results page resource. A search result is data generated by the search engine 110 that identifies a resource that satisfies a particular search query, and includes a resource locator for the resource. An example search result can include a web page title, a snippet of text extracted from the web page, and the URL of the web page. The search results are ordered according to various scores and provided to the user device according to the order.

The user devices 106 receive the search results pages and render the pages for presentation to users. In response to the user selecting a search result at a user device 106, the user device 106 requests the resource 104 identified by the resource locator included in the selected search result. The publisher of the web site hosting the resource 104 receives the request for the resource from the user device 106 and provides the resource 104 to the requesting user device 106.

In some implementations, the queries submitted from user devices 106 are stored in query logs. Click data for the queries and the web pages referenced by the search results are stored in click logs. The query logs and the click logs define search history data that include data from and related to previous search requests associated with unique identifiers. The click logs define actions taken responsive to search results provided by the search engine. The query logs and click logs can be used to map queries submitted by the user devices to web pages that were identified in search results and the actions taken by users (i.e., that data are associated with the identifiers from the search requests so that a search history for each identifier can be accessed). The click logs and query logs can thus be used by the search engine to determine the sequence of queries submitted by the user devices, the actions taken in response to the queries, and how often the queries are submitted.

The content management system 112 facilitates the provisioning of content items, such as advertisements, with the resources 104. In particular, the content management system 112 allows content providers 108 to define selection rules that take into account attributes of a particular user device 106 to provide content items for the users. Example selection rules include keyword selection, in which content providers provide bids for keywords that are present in either search queries or webpage content. Content items that are associated with keywords having bids that result in a content item slot being awarded in response to an auction are selected for displaying in the content item slots.

When a user of a user device 106 selects a content item, the user device 106 generates a request for a landing page of the content item, which is typically a webpage of the content provider. For example, the resource publishers may include advertisers, each hosting respective web pages, some of which are landing pages for advertisements of the advertisers.

These content items can be provided for many different resources 104, such as the resources 104 of the publishers, and on a search results page resource. For example, a resource 104 from a publisher may include instructions that cause the user device to request advertisements from the content management system 112. The request includes a publisher identifier and, optionally, keyword identifiers related to the content of the resource 104. The content management system 112, in turn, provides advertisements to the particular user device.

With respect to a search results page, the user device 106 renders the search results page and sends a request to the content management system 112, along with one or more keywords related to the query that the user provided to the search engine 110. For example, the request may include a search query and data identifying content item slots of the search results page. The content management system 120, in turn, provides content items to the particular user device for display in the content item slots of the search results page.

The content management system 112 includes a data storage system that stores content item data 116. The content item data 116 stores content items, selection information, and budgeting information for content providers. In addition, the content item data 116 stores performance data indicating the performance of the content items that are served. Such performance data can include, for example, position and/or content item slot in which a content item is presented, click-through rates for content items, the number of impressions for content items, and the number of conversions for content items. Other performance data can also be stored in the content item data 116.

The content item data 116 also stores data indicating performance of content items when presented in particular resources 104. For example, the content item data 116 may include data that specifies, for a search results page resource, performance data for content items that were presented in the search results page resource. The data may specify, for each content item slot of a resource, the performance of content items when presented in the content item slot. By way of example, if a particular web page has three advertisement slots, the content item data 116 may include, for each advertisement slot, a click through rate ("CTR") of advertisements that were presented in the advertisement slot. Furthermore, the click through rate for each advertisement in each slot can also be stored, as can the click-through rate for each advertisement in each slot for each query.

The content item data 116 also includes data specifying the context in which content items were presented. For example, the content item data 116 may specify, for each presentation of a content item, whether that content item was presented in a navigational context, or, stated differently, whether the content item was navigational for a given presentation of the content item. Determining whether a content item was navigational depends on the context in which the content item was presented. In addition, the same content item may be navigational in one context, but not in another. For example, a content item that is to be presented with a search results page resource may be considered navigational if the domain name associated with the landing page of the content item matches the search query. For example, a content item with a landing page of www.example.com may be navigational for the search query, "example." On the other hand, the same content item may not be navigational for any other search query. Likewise, a navigational content item may be one that corresponds to a "navigational query." A navigational query is a query for which there is one particular result that users typically select, and for which users enter with the intent of finding the particular result. The navigational content item may be a content item, such as an ad, that also links to the particular result. Determining whether a content item is navigational is described in further detail below.

The content item data 116 may be used as input to a content item auction. For example, the content management system 112, in response to each request for advertisements, conducts an auction to select advertisements that are provided in response to the request. The advertisements are ranked according to a score that, in some implementations, is proportional to a value based on an advertisement bid and one or more parameters specified in the content item data 116. The highest ranked advertisements resulting from the auction are selected and provided to the requesting user device.

Content Item Presentation Context

Figure 2:
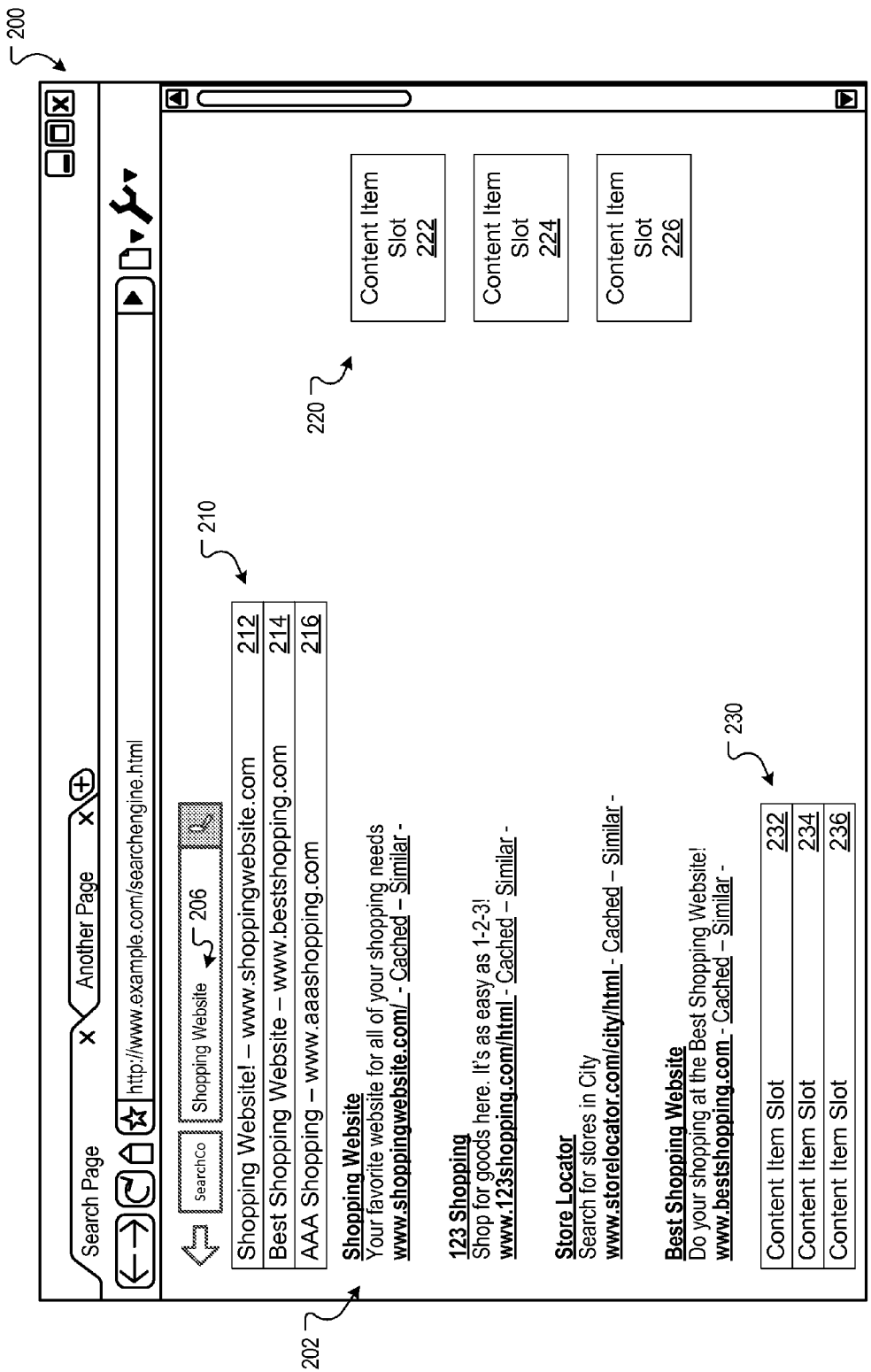
FIG. 2 is an example screen shot of a user interface used to illustrate content item selection based on presentation context.

FIG. 2 is an example screen shot of a user interface 200 used to illustrate content item selection based on presentation context. The example user interface 200 depicts a search results page resource presented in a web browser of a user device.

The user interface 200 depicts a list of search results 202 that were presented in response to a search query 206. For example, a user device may have provided the search query 206, "shopping website," to a search engine. In response to receiving the search query 206, the search engine provides the user device with a search results resource that includes the list of search results 202 as well as instructions for requesting content items to be placed in content item slots of the search results page resource.

The example user interface 200 includes three content item blocks 210, 220, and 230. Each content item block in the example includes three content item slots. Content item block 210 is displayed at the top of the search results page resource and includes three content item slots 212, 214, and 216. Content item block 220 is displayed on the right side and near the middle of the search results page resource and includes three content item slots 222, 224, and 226. Content item block 230 is displayed at the bottom of the search results page resource and includes three content item slots 232, 234, and 236. Any suitable number, type, and location of content item blocks and content item slots may be used.

When the user device renders the example search results page, it requests content items from the content management system. When the content management system receives the request, it selects content items to provide in each content item slot. As described above, the content management system uses various types of data to determine which content items will be presented in which content item slots. For example, the content management system may calculate a predicted performance measure, e.g., a predicted click-through rate, for each content item eligible to be presented in a content item slot. Using the predicted performance measure and bid for each content item, the content management system selects a content item to provide the requesting user device for presentation in the content item slot.

The content management system may adjust a predicted performance measure or other metric used to rank and select content items based on the context in which the content items are to be presented. These adjustments may be used to reduce or promote a bias for certain content items in certain situations. For example, when adjusting predicted performance measures based on context, the content management system may adjust a predicted performance measure based on performance data that corresponds to the content item slot in which a content item is to be presented.

Navigational Performance Adjustment Factor

A navigational performance adjustment factor is one metric that may be used by a content management system to adjust a performance metric for a content item during the selection of content items for presentation in a content item slot. The content management system determines navigational performance adjustment factors for each content item slot of a resource. The process used to determine the navigational performance adjustment factor for a content item slot is described below.

The content management system obtains a first performance measurement for a content item slot that is based on the performance of content items that were presented in that slot in a navigational context. For example, the content item presented in content item slot 212 is being presented in a navigational context because the network address associated with the content item is similar to the search query 206, e.g., the mid-level domain name, "shoppingwebsite," is similar to the search query, "shopping website." Thus, the first performance measurement may indicate, for the content item slot 212, a historical click-through rate for navigational content items.

The content management system obtains a second performance measurement for a content item slot that is based on the performance of content items that were presented in that slot in a non-navigational context. For example, the content item presented in content item slot 214 is non-navigational, because the network address associated with the content item is not similar enough to the search query 206, e.g., the mid-level domain name, "bestshopping," is not similar enough to the search query, "shopping website," to be navigational for that search query. Thus, the second performance measurement may indicate, for a given content item slot, a historical click-through rate for non-navigational content items.

Whether a content item is navigational, or presented in a navigational context, may be determined using any suitable method. The method above, e.g., comparing a search query to a content item landing page or other content item text, is one example. Another example is determining that a content item is navigational for a particular query based on a historical click-through rate that meets a threshold click-through rate. The navigational-ness of a content item may depend on the query, and a single content item may be navigational for multiple queries.

In some implementations, the content management system obtains a third performance measurement for a content item slot that is based on the performance of content items that were presented in that content item slot in a non-navigational context when co-presented content items were presented in a navigational context in another content item slot. Using the examples above, the content item presented in slot 212 is navigational, while the content item presented in slot 214 is non-navigational. In this context, e.g., when at least one content item that is presented is navigational, the frequency with which non-navigational content items are selected may be different from a context in which no navigational content item is co-presented. Thus, the third performance measurement may indicate, for a given content item slot, a historical CTR of non-navigational content items that were co-presented with a navigational content item.

In some implementations, a binary decision is made for each content item, e.g., the content item is either navigational for a query, or it is not. In another implementation, content items may have a navigational score that indicates the likelihood that a particular content item is navigational for a particular query. For example, a navigational score of 0.1 for a content item-query pair on a scale of 0 to 1 may indicate a low likelihood that the content item is navigational for the query, while a navigational score of 0.9 for a content item-query pair may indicate a high likelihood that the content item is navigational for the query. Other appropriate navigational scoring scales can also be used. A navigational score may be compared to a threshold to determine whether a content item is navigational for a query, or the navigational score may be used as a measure of navigational-ness for a given content item-query pair.

In some implementations, the content of the resource with which the content item is presented or similarity between a content item and a search query may be used to determine the navigational-ness of the content item. For example, a search results page resource may be provided for a particular search query, the navigational-ness of a content item that is to be presented is based on similarities between the particular search query and the content item.

A number of suitable factors may be used to determine a navigational score for a given content item-query pair, such as a measure of similarity of the query to text in the content item or a landing page of the content item. As another example, the click-through rate (CTR) for the content item when presented in response to the query may affect a navigational score, e.g., if the content item has the highest CTR among other content items presented in response to the query, that may increase a navigational score. Another example factor that may be used to determine a navigational score is similarity between a content item and the top search result for a particular query, or similarity between a content item and the navigational search result for a particular query. For example, if the landing page of the content item is hosted on the same domain as the landing page of a navigational search result for the query, the content item may be identified as navigational, or have a high navigational score.

The first and second performance measurements for a content item slot are used to determine a navigational performance adjustment factor for the content item slot. The navigational performance adjustment factor indicates, for that content item slot, the performance of content items presented in a navigational context relative to the performance of content items presented in the non-navigational context. For example, performance data for content item slot 212 may indicate that navigational content items presented in that slot have significantly higher click-through rates than non-navigational content items. In the example user interface 200, content item slot 212 is near the top of the page, and displayed more prominently than the search results 202. Because of the display position, a navigational content item in the first content item slot 212 may be clicked on more frequently than a non-navigational content item presented in the first content item slot 212.

As another example, performance data for content item slot 232 may indicate that navigational content items presented in that slot have significantly lower click-through rates than non-navigational content items. In the example user interface, content item slot 232 is near the bottom of the page and displayed in a less prominent position than the search results 202 and the other content item blocks 210 and 220. Because of the display position, a navigational content item in the content item slot 232 may not be clicked on frequently, because a user may have already ignored a navigational search result in the list of search results 202, indicating that a navigational content item is probably not what the user is looking for. On the other hand, a non-navigational content item may be clicked on more frequently when presented in content item slot 232, because if a user made it to the bottom of the search results page, the user likely was not interested in a navigational content item or search result which may have been presented in a more prominent position.

As an example, the content management system may determine that, in a particular content item slot, navigational content items are clicked on twice as often as non-navigational content items presented in the same content item slot. In this situation, a navigational performance adjustment factor may be 2. If, on the other hand, a CTR for navigational content items in a particular content item slot is half of the CTR for non-navigational content items, the navigational performance adjustment factor may be 0.5. In the foregoing examples, the navigational performance adjustment factor is directly proportional to the CTR of navigational content items presented in the content item slot relative to the CTR of non-navigational content items presented in the same content item slot; however, any suitable formula may be used to determine navigational performance adjustment factors.

In some implementations, a navigational performance adjustment factor for a content item slot may be based on the third performance measurement. The navigational performance adjustment factor may indicate, for a content item slot, a relative performance of content items presented in a non-navigational context when another content item is co-presented in a navigational context in another content item slot. The relative performance may be, for example, relative to all or a portion of the performance data for the content item slot. For example, the content management system may determine that, in a particular content item slot, non-navigational content items, when co-presented with navigational content items, are clicked on with 1/10 of the frequency of all other presentations of content items in the content item slot. In this situation, a navigational performance adjustment factor for slot 214 may be 0.1. This navigational performance adjustment factor may be used in addition to or instead of a navigational performance adjustment factor that is based on the first and/or second performance measurements.

In some implementations, navigational performance adjustment factors may be calculated for each content item block. For example, an aggregation of first and second performance measures for content item slots included in a particular content item block may be used to determine a navigational performance adjustment factor for the content item block. Content item blocks may be defined by any number of content item slots located in any portion of a resource.

In some implementations, multiple performance adjustment factors may be calculated per content item, content item slot, or content item block. For example, a navigational performance adjustment factor may be calculated and used for navigational presentations of content, while a separate non-navigational performance adjustment factor is used for non-navigational presentations of content. Other performance adjustment factors may also be calculated and stored/used separately, such as a performance adjustment factor for a non-navigational presentation of content when another content item is being co-presented in a navigational context.

As discussed above, the content management system may adjust predicted performance measures or another metric used to rank and select content items based on the context in which the content items are to be presented. In some implementations, the predicted performance measure of a content item that is to be presented in a navigational context is adjusted based on the navigational performance adjustment factor for the content item slot in which the content item is to be presented. For example, if a navigational performance adjustment factor for a content item slot is 2, a navigational content item that is eligible to be served in that content item slot may have its CTR multiplied by 2. Multiplication is one suitable form of adjustment, and any mathematical operation or formula may be used to adjust predicted performance measures. In some implementations, a navigational score, such as the one described above, may also be used to adjust predicted performance measures.

In some implementations, the content management system may use a navigational performance adjustment factor to normalize content item performance metrics. A direct comparison of historical performance of two different content items may not properly identify which content item is more effective if the historical performance does not take presentation context into account. For example, a particular content item may have a historically high CTR, but the content item may have often been presented in a navigational context in a content item slot where navigational content items tend to perform well. Accordingly, the CTR of the content item may be normalized, e.g., decreased in the above example, using navigational performance adjustment factors for content item slots in which the content item was presented. Normalizing performance metrics facilitates a more accurate comparison of content item quality—independent of some potential presentation context bias.

In some implementations, content items are selected based on adjusted predicted performance measures and presented to a requesting user device. For example, a user device rendering the search results page in the example user interface 200 may request nine content items, one for each content item slot. The content management system selects eligible content items for each slot based on predicted performance measures and, if applicable, adjusted predicted performance measures. The selected content items are then provided to the user device for display with the search results resource.

Content Item Extensions

In some implementations, content items may be presented with one or more extensions, which are additional content to be provided with a content item. For example, an advertisement may, in some, but not all, situations, include a phone number at which the advertiser may be reached. Another example advertisement extension is an advertiser rating that indicates an average user review associated with the advertiser. Extensions may or may not be included in a given presentation of a content item, and they may or may not be interactive, e.g., a hyperlink. An extension adjustment factor may, in some implementations, be generated for a content item, content item extension, and/or content item slot. For example, the extension adjustment factor may indicate, for a particular content item, the performance of the content item when presented with the extension relative to the performance of the content item when presented without the extension. The extension adjustment factor may be used to select content item extensions to be presented with a content item.

For example, the first and second performance data may each include data specifying one or more content item extensions that were presented with the content items. For each of the content items that were presented in a navigational context, extension performance data may be obtained for the content item based on the performance of the content item when presented in the navigational context with an extension. Non-extension performance data may also be obtained for the content item based on the performance of the content item when presented in the navigational context without the extension. For example, first and second performance data for an advertisement may indicate the CTR of that advertisement when it was presented in a navigational context with an extension and without an extension. If the CTR of the advertisement when presented with an extension was 50% higher than the CTR of the advertisement when presented without an extension, an example extension adjustment factor may be 1.5, which indicates that the advertisement, when presented in a navigational context, performs 1.5 times better with an extension than without an extension. The extension adjustment factor may be calculated per extension, per content item, per content item presentation context, per content item slot, per content item block, per subset of content items, per subset of content item blocks and/or across all content items and/or content item blocks.

In some implementations, the extension adjustment factor may be used to determine whether a content item extension is to be presented with a content item, or if the content item is to be presented without an extension. For example, extension adjustment factors may be calculated based on content item context, and they may indicate, for navigational and non-navigational contexts, a relative performance of a content item when presented with or without an extension. The extension adjustment factor may be compared to a threshold to determine whether an extension is to be presented with a content item. When the extension adjustment factor exceeds a threshold value, an extension may be presented with the content item. When the extension adjustment factor does not meet the threshold value, the extension may not be presented with the content item.

Navigational Performance Adjustment Process

Figure 3A:
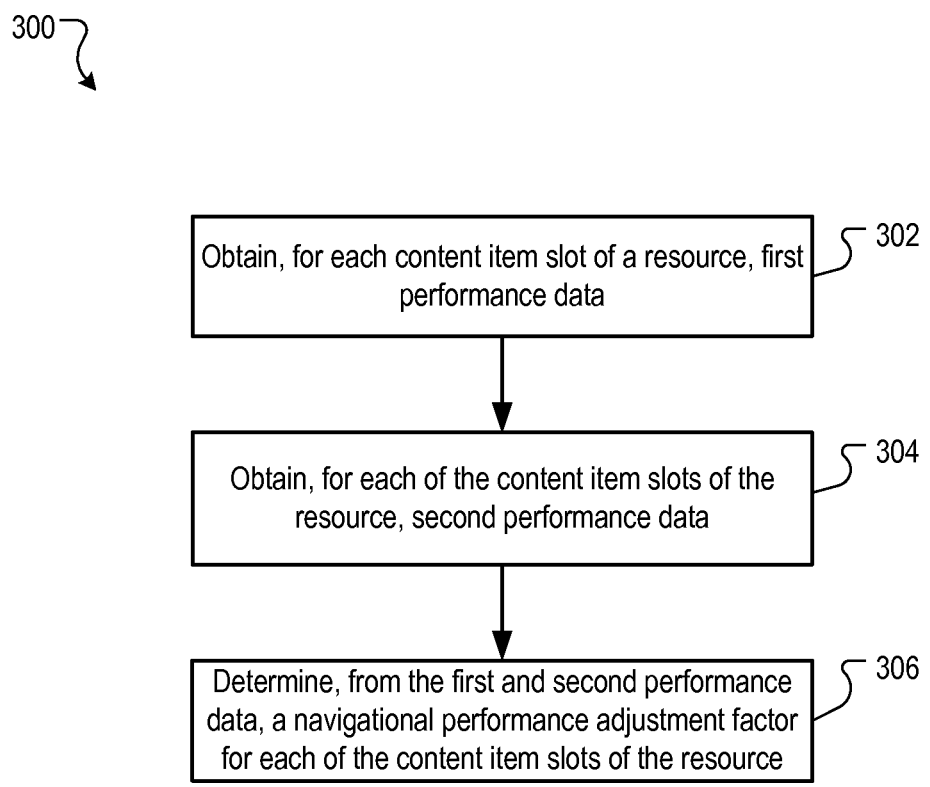
FIG. 3A is a flow diagram of an example process in which a navigational performance adjustment factor is determined.

FIG. 3A is a flow diagram of an example process 300 in which a navigational performance adjustment factor is determined. The process 300 may be performed by a data processing apparatus, such as a content management system.

The process 300 obtains, for each content item slot of a resource, first performance data (302). The first performance data is based on the performance of content items that were presented in a navigational context in the content item slot. For example, the first performance data may be a historical average CTR of navigational advertisements that were presented in an advertisement slot of a search results page.

The process 300 obtains, for each of the content item slots of the resource, second performance data (304). The second performance data is based on the performance of content items that were presented in a non-navigational context in the content item slot. For example, the second performance data may be a historical average CTR of non-navigational advertisements that were presented in an advertisement slot of a search results page.

The process 300 determines, from the first and second performance data, a navigational performance adjustment factor for each of the content item slots of the resource (306). The navigational performance adjustment factor indicates, for a content item slot, a performance of content items presented in the navigational context relative to a performance of content items presented in the non-navigational context. For example, the navigational performance adjustment factor for an advertisement slot may indicate how well navigational advertisements presented in the advertisement slot perform relative to well non-navigational advertisements perform in the same advertisement slot.

In some implementations, the navigational context of a given presentation of a content item is based on the content item and the query. For example, an advertisement may be considered navigational when the domain name of the landing page of the advertisement matches a search query or a keyword associated with the search query.

Figure 3B:
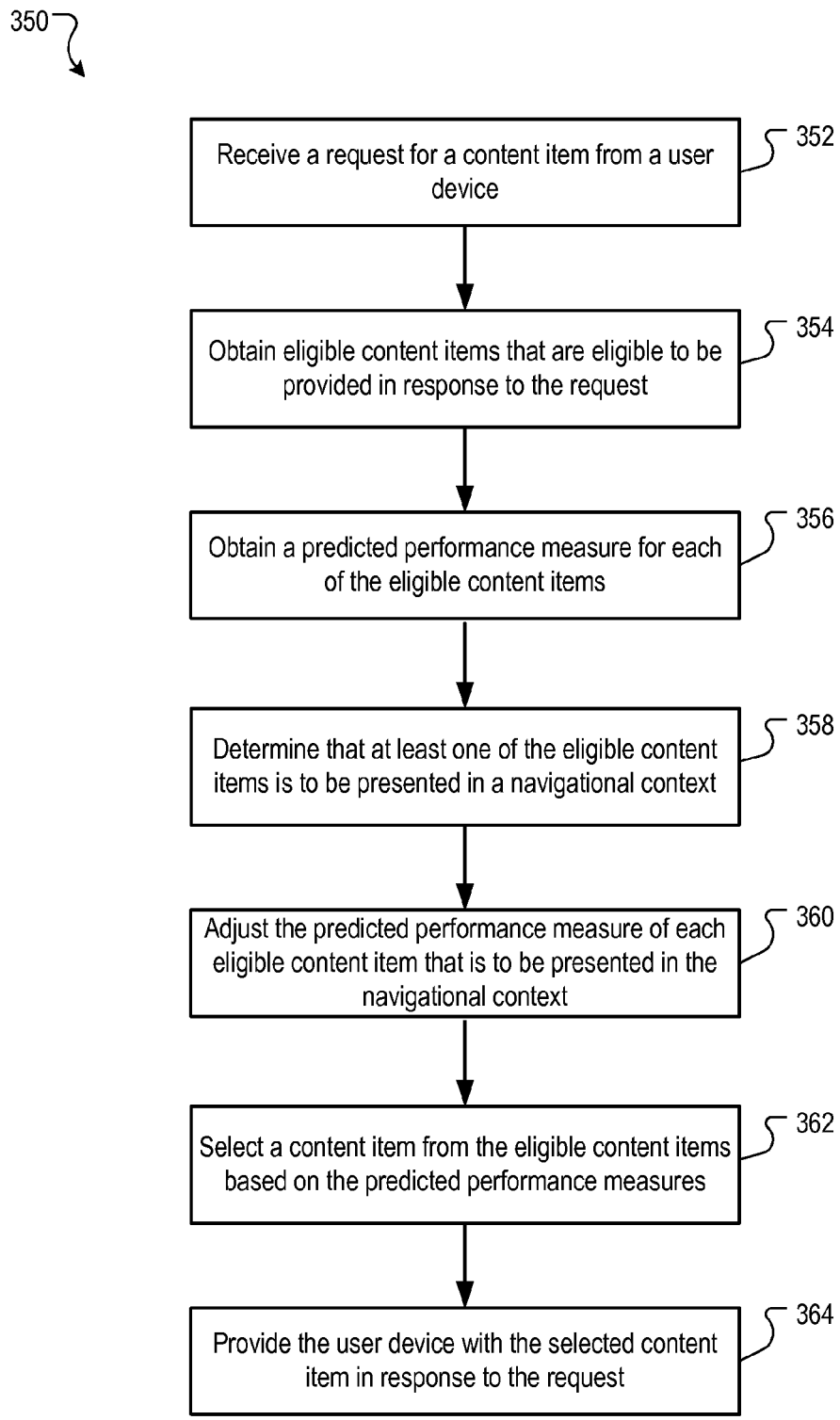
FIG. 3B is a flow diagram of an example process in which content items are selected based on presentation context.

FIG. 3B is a flow diagram of an example process 350 in which content items are selected based on presentation context. The process 350 may be performed by a data processing apparatus, such as a content management system. In some implementations, the process 350 may be performed by a content management system after the process 300 described above with reference to FIG. 3A has been performed.

The process 350 receives a request for a content item from a user device (352). The request specifies one of the content item slots of a resource. For example, a user device that is rendering a search results page may request advertisements to be presented in advertisement slots of the search results page.

The process 350 obtains eligible content items that are eligible to be provided in response to the request (354). For example, the content management system may identify keywords associated with a search query that is included in a request for an advertisement. Advertisements that are associated with the keywords may be eligible to be provided in response to the advertisement request.

The process 350 obtains a predicted performance measure for each of the eligible content items (356). For example, the content management system may obtain predicted CTRs for each eligible advertisement. The predicted CTR may be based on, for example, historical CTRs of the eligible advertisements.

The process 350 determines that at least one of the eligible content items is to be presented in a navigational context (358). In some implementations, a query associated with the request is identified, and the determination that at least one of the eligible content items is to be presented in a navigational context is based on the query and the at least one eligible content item.

In some implementations, the process 350 obtains a navigational score for a particular eligible content item. The navigational score indicates a measure of likelihood that the particular eligible content item is navigational for the query associated with the content item request. The process 350 may then determine whether the navigational score for the particular eligible content item meets a navigational score threshold. Once the threshold is met, the process 350 may determine that the particular eligible content item is to be presented in the navigational context.

The process 350 adjusts the predicted performance measure of each eligible content item that is to be presented in the navigational context (360). The adjustment is based on the navigational performance adjustment factor that corresponds to the content item slot specified by the request.

In some implementations, adjusting the predicted performance measure includes increasing the predicted performance measure for each eligible content item that is to be presented in the navigational context. For example, for an advertisement slot in which navigational advertisements perform better than non-navigational advertisements, the predicted CTR of an advertisement that is to be presented in a navigational context may be multiplied by a navigational performance adjustment factor that is greater than 1, which results in an increased predicted CTR measure.

In some implementations, adjusting the predicted performance measure includes decreasing the predicted performance measure for each eligible content item that is to be presented in the navigational context. For example, for an advertisement slot in which non-navigational advertisements perform better than navigational advertisements, the predicted CTR of an advertisement that is to be presented in a navigational context may be multiplied by a navigational performance adjustment factor that is less than 1, which results in a decreased predicted CTR measure.

In some implementations, the process 350 selects a content item from the eligible content items based on the predicted performance measures (362). For example, using a bid and the predicted CTR for each eligible content item, including navigational and non-navigational content items, the content management system selects a content item. The process 350 may then provide the user device with the selected content item in response to the request (364). In some implementations, a portion of the process, such as steps 354-362, may be repeated for each content item slot of a resource. For example, the content management system may receive a request for multiple content items to be presented in multiple content item slots, and the steps 354-362 may be repeated for each content item slot. In the foregoing example, each of the selected content items may be provided to the user device at once or one at a time.

Additional Implementation Details

Figure 4:
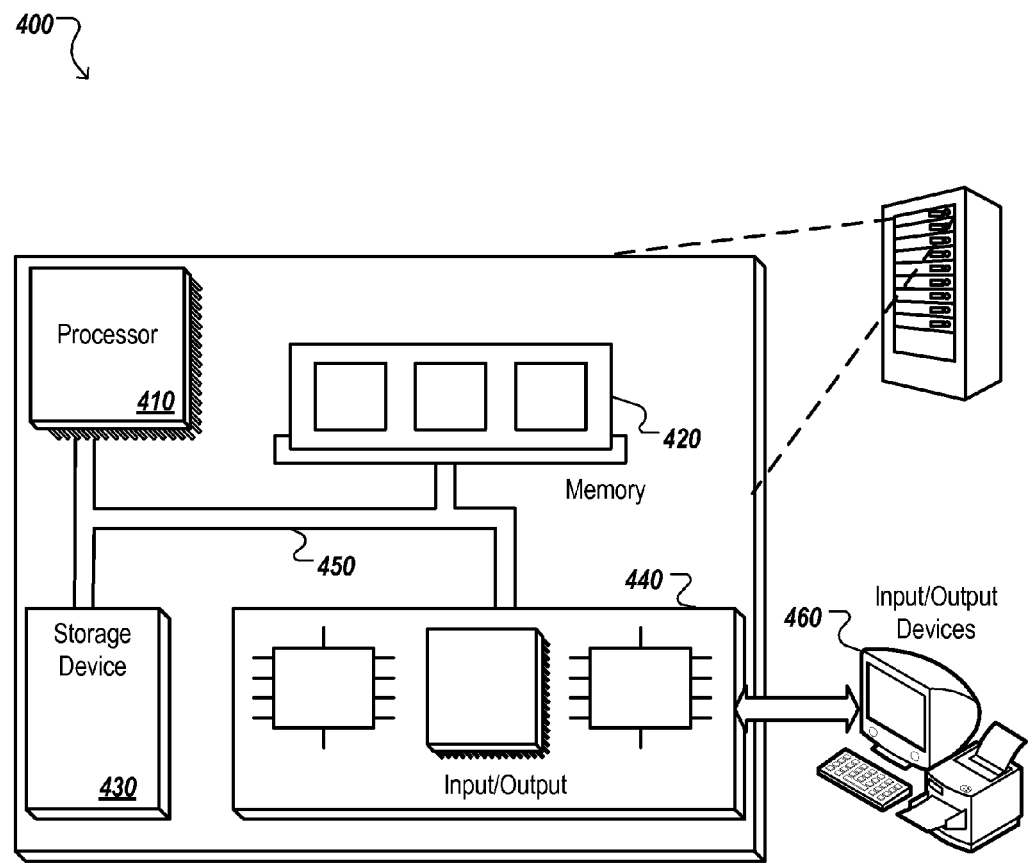
FIG. 4 is a block diagram of an example data processing apparatus.

FIG. 4 is a block diagram of an example data processing apparatus. The system 400 includes a processor 410, a memory 420, a storage device 430, and an input/output device 440. Each of the components 410, 420, 430, and 440 can, for example, be interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can, for example, include a hard disk device, an optical disk device, or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
identifying a given content item that is eligible to be transmitted to a user device; obtaining, for the given content item, a predicted performance measure;
determining, by one or more computers, that the given content item will be presented at the user device in a navigational context, including determining that a similarity between a search query and a domain name of a landing page for the given content item meets a navigational similarity threshold;
obtaining a navigational performance adjustment factor that indicates a relative performance of content items presented in the navigational context relative to performance of content items presented in a non-navigational context, wherein the non-navigational context is a context in which the search query and the domain name of the content items does not meet the navigational similarity threshold;
adjusting, by the one or more computers and using the navigational performance adjustment factor for a content item slot in which the given content item will be presented, the predicted performance measure of the given content item based on the determination that the given content item will be presented in the navigational context;
selecting, based on the adjusted predicted performance measure, the given content item from among a plurality of available content items; and
updating a user interface of the user device to present the given content item based on the selection of the given content item.

2. The method of claim 1, further comprising:
receiving a request for a content item from the user device, the request specifying one of the plurality of content item slots of the resource and a query associated with the request; and
obtaining a plurality of eligible content items that are eligible to be provided in response to the request.

3. The method of claim 2, further comprising:
obtaining a navigational score for the given content item, the navigational score indicating a measure of likelihood that the given content item is navigational for the query associated with the request, wherein:
determining that the given content item will be presented at the user device in a navigational context comprises:
determining that the navigational score for the given content item meets a navigational score threshold; and
in response to determining that the navigational score for the given content item meets the navigational score threshold, determining that the given content item is to be presented in the navigational context.

4. The method of claim 1, wherein adjusting the predicted performance measure of the given content item comprises increasing the predicted performance measure of the given content item by multiplying the predicted performance measure of the given content item by the navigational performance adjustment factor that corresponds to a content item slot specified by the request.

5. The method of claim 1, further comprising determining, from first performance data and second performance data, the navigational performance adjustment factor for the content item slot, the navigational performance adjustment factor indicating, for the content item slot, a performance of content items presented in the navigational context relative to a performance of content items presented in the non-navigational context, wherein the first performance data represents performance of content items presented in the navigational context relative and the second performance data represents performance of content items presented in the non-navigational context.

6. The method of claim 5, wherein:
the first performance data comprises a first click-through rate;
the second performance data comprises a second click-through rate; and
the predicted performance measure is a predicted click-through rate.

7. A system comprising:
a data processing apparatus; and
a data store storing instructions that, when executed by the data processing apparatus, cause the data processing apparatus to perform operations comprising:
identifying a given content item that is eligible to be transmitted to a user device;
obtaining, for the given content item, a predicted performance measure;
determining that the given content item will be presented at the user device in a navigational context, including determining that a similarity between a search query and a domain name of a landing page for the given content item meets a navigational similarity threshold;
obtaining a navigational performance adjustment factor that indicates a relative performance of content items presented in the navigational context relative to performance of content items presented in a non-navigational context, wherein the non-navigational context is a context in which the search query and the domain name of the content items does not meet the navigational similarity threshold;
adjusting, using the navigational performance adjustment factor for a content item slot in which the given content item will be presented, the predicted performance measure of the given content item based on the determination that the given content item will be presented in the navigational context;
selecting, based on the adjusted predicted performance measure, the given content item from among a plurality of available content items; and
updating a user interface of the user device to present the given content item based on the selection of the given content item.

8. The system of claim 7, wherein the instructions cause the data processing apparatus to perform operations further comprising:
receiving a request for a content item from the user device, the request specifying one of the plurality of content item slots of the resource and a query associated with the request; and
obtaining a plurality of eligible content items that are eligible to be provided in response to the request.

9. The system of claim 8, wherein the instructions cause the data processing apparatus to perform operations further comprising:
obtaining a navigational score for the given content item, the navigational score indicating a measure of likelihood that the given content item is navigational for the query associated with the request, wherein:
determining that the given content item will be presented at the user device in a navigational context comprises:
determining that the navigational score for the given content item meets a navigational score threshold; and
in response to determining that the navigational score for the given content item meets the navigational score threshold, determining that the given content item is to be presented in the navigational context.

10. The system of claim 7, wherein adjusting the predicted performance measure of the given content item comprises increasing the predicted performance measure of the given content item by multiplying the predicted performance measure of the given content item by the navigational performance adjustment factor that corresponds to a content item slot specified by the request.

11. The method of claim 7, wherein the instructions cause the data processing apparatus to perform operations further comprising determining, from first performance data and second performance data, the navigational performance adjustment factor for the content item slot, the navigational performance adjustment factor indicating, for the content item slot, a performance of content items presented in the navigational context relative to a performance of content items presented in the non-navigational context, wherein the first performance data represents performance of content items presented in the navigational context relative and the second performance data represents performance of content items presented in the non-navigational context.

12. The system of claim 11, wherein:
the first performance data comprises a first click-through rate;
the second performance data comprises a second click-through rate; and
the predicted performance measure is a predicted click-through rate.

13. A non-transitory computer readable medium comprising instructions that, when executed by a data processing apparatus, cause the data processing apparatus to perform operations comprising:
identifying a given content item that is eligible to be transmitted to a user device;
obtaining, for the given content item, a predicted performance measure;
determining that the given content item will be presented at the user device in a navigational context, including determining that a similarity between a search query and a domain name of a landing page for the given content item meets a navigational similarity threshold;
obtaining a navigational performance adjustment factor that indicates a relative performance of content items presented in the navigational context relative to performance of content items presented in a non-navigational context, wherein the non-navigational context is a context in which the search query and the domain name of the content items does not meet the navigational similarity threshold;
adjusting, using the navigational performance adjustment factor for a content item slot in which the given content item will be presented, the predicted performance measure of the given content item based on the determination that the given content item will be presented in the navigational context;
selecting, based on the adjusted predicted performance measure, the given content item from among a plurality of available content items; and updating a user interface of the user device to present the given content item based on the selection of the given content item.

14. The non-transitory computer readable medium of claim 13, wherein the instructions cause the data processing apparatus to perform operations further comprising:
receiving a request for a content item from the user device, the request specifying one of the plurality of content item slots of the resource and a query associated with the request; and
obtaining a plurality of eligible content items that are eligible to be provided in response to the request.

15. The non-transitory computer readable medium of claim 14, wherein the instructions cause the data processing apparatus to perform operations further comprising:
obtaining a navigational score for the given content item, the navigational score indicating a measure of likelihood that the given content item is navigational for the query associated with the request, wherein:
determining that the given content item will be presented at the user device in a navigational context comprises:
determining that the navigational score for the given content item meets a navigational score threshold; and
in response to determining that the navigational score for the given content item meets the navigational score threshold, determining that the given content item is to be presented in the navigational context.

16. The non-transitory computer readable medium of claim 13, wherein adjusting the predicted performance measure of the given content item comprises increasing the predicted performance measure of the given content item by multiplying the predicted performance measure of the given content item by the navigational performance adjustment factor that corresponds to a content item slot specified by the request.

17. The non-transitory computer readable medium of claim 13, wherein the instructions cause the data processing apparatus to perform operations further comprising determining, from first performance data and second performance data, the navigational performance adjustment factor for the content item slot, the navigational performance adjustment factor indicating, for the content item slot, a performance of content items presented in the navigational context relative to a performance of content items presented in the non-navigational context, wherein the first performance data represents performance of content items presented in the navigational context relative and the second performance data represents performance of content items presented in the non-navigational context.

18. The non-transitory computer readable medium of claim 11, wherein:
the first performance data comprises a first click-through rate;
the second performance data comprises a second click-through rate; and
the predicted performance measure is a predicted click-through rate.

* * * * *